United States Patent [19]
Moore et al.

[11] Patent Number: 5,476,421
[45] Date of Patent: Dec. 19, 1995

[54] SHOCK ABSORBING ASSEMBLY

[75] Inventors: Richard E. Moore, Humble, Tex.;
John T. Work, Kingman, Ariz.

[73] Assignee: Duramax, Inc., Middlefield, Ohio

[21] Appl. No.: 80,368

[22] Filed: Jun. 21, 1993

Related U.S. Application Data

[63] Continuation-in-part of Ser. No. 800,697, Dec. 2, 1991, abandoned, which is a continuation of Ser. No. 571,308, Aug. 22, 1990, abandoned.

[51] Int. Cl.⁶ ............................................................. F16D 3/64
[52] U.S. Cl. ...................................... 464/20; 464/96
[58] Field of Search ............................ 464/18, 20, 21, 464/87, 89, 92, 93, 94, 95, 96; 175/321

[56] References Cited

U.S. PATENT DOCUMENTS

| | | |
|---|---|---|
| 1,453,505 | 5/1923 | Kendall . |
| 2,067,284 | 1/1937 | Pearce . |
| 2,142,784 | 1/1939 | Guy . |
| 2,339,549 | 1/1944 | Kubaugh . |
| 2,497,623 | 2/1950 | Nolen . |
| 2,587,105 | 2/1952 | Bronzan . |
| 2,659,218 | 11/1953 | Riopelle . |
| 2,945,365 | 7/1960 | Ulderup et al. . |
| 2,949,325 | 8/1960 | Nenzell . |
| 2,981,232 | 4/1961 | Peras . |
| 3,033,011 | 5/1962 | Garrett . |
| 3,146,612 | 9/1964 | Lorenz . |
| 3,247,752 | 4/1966 | Greenleaf et al. . |
| 3,399,589 | 9/1968 | Breed . |
| 3,408,830 | 11/1968 | Sutaruk et al. . |
| 3,422,721 | 1/1969 | Yonkers . |
| 3,464,309 | 9/1969 | Kilmarx . |
| 3,746,330 | 7/1973 | Taciuk . |
| 3,775,998 | 12/1973 | Century et al. . |
| 3,779,040 | 12/1973 | Garrett . |
| 3,836,183 | 9/1974 | Battle . |
| 3,947,009 | 3/1976 | Nelmark . |
| 3,973,789 | 8/1976 | Kunz et al. . |
| 4,109,488 | 8/1978 | Work . |
| 4,139,994 | 2/1979 | Alther . |
| 4,183,258 | 1/1980 | Stephan . |
| 4,230,326 | 10/1980 | White . |
| 4,385,897 | 5/1983 | Mallet . |
| 4,406,640 | 9/1983 | Franklin . |
| 4,479,786 | 10/1984 | De Bisschop . |
| 4,571,215 | 2/1986 | Hansen . |
| 4,759,739 | 7/1988 | Johnson . |
| 5,372,548 | 12/1994 | Wohlfeld ................................ 464/20 |

FOREIGN PATENT DOCUMENTS

| | | |
|---|---|---|
| 458167 | 7/1949 | Canada . |
| 1060880 | 8/1979 | Canada . |

OTHER PUBLICATIONS

Attached sheets 1 and 2 of Drawings referenced as 74–011, date unknown.
Epley Enterprises, Inc.—"Rough Rider Shock Sub" Ower's Manual Sep. 24, 1990.

*Primary Examiner*—Daniel P. Stodola
*Assistant Examiner*—Eileen A. Dunn
*Attorney, Agent, or Firm*—D. Peter Hochberg; Mark Kusner; Michael Jaffe

[57] ABSTRACT

A shock absorbing assembly for a drilling machine utilizing a down hole hammer having a driver member for receiving input forces, a driven member for transmitting forces from the driver member to an attached drill string, and a resilient member which is placed under tension and elongated when downward forces are applied. The resilient member under tension receives and dissipates shocks and vibrations.

14 Claims, 10 Drawing Sheets

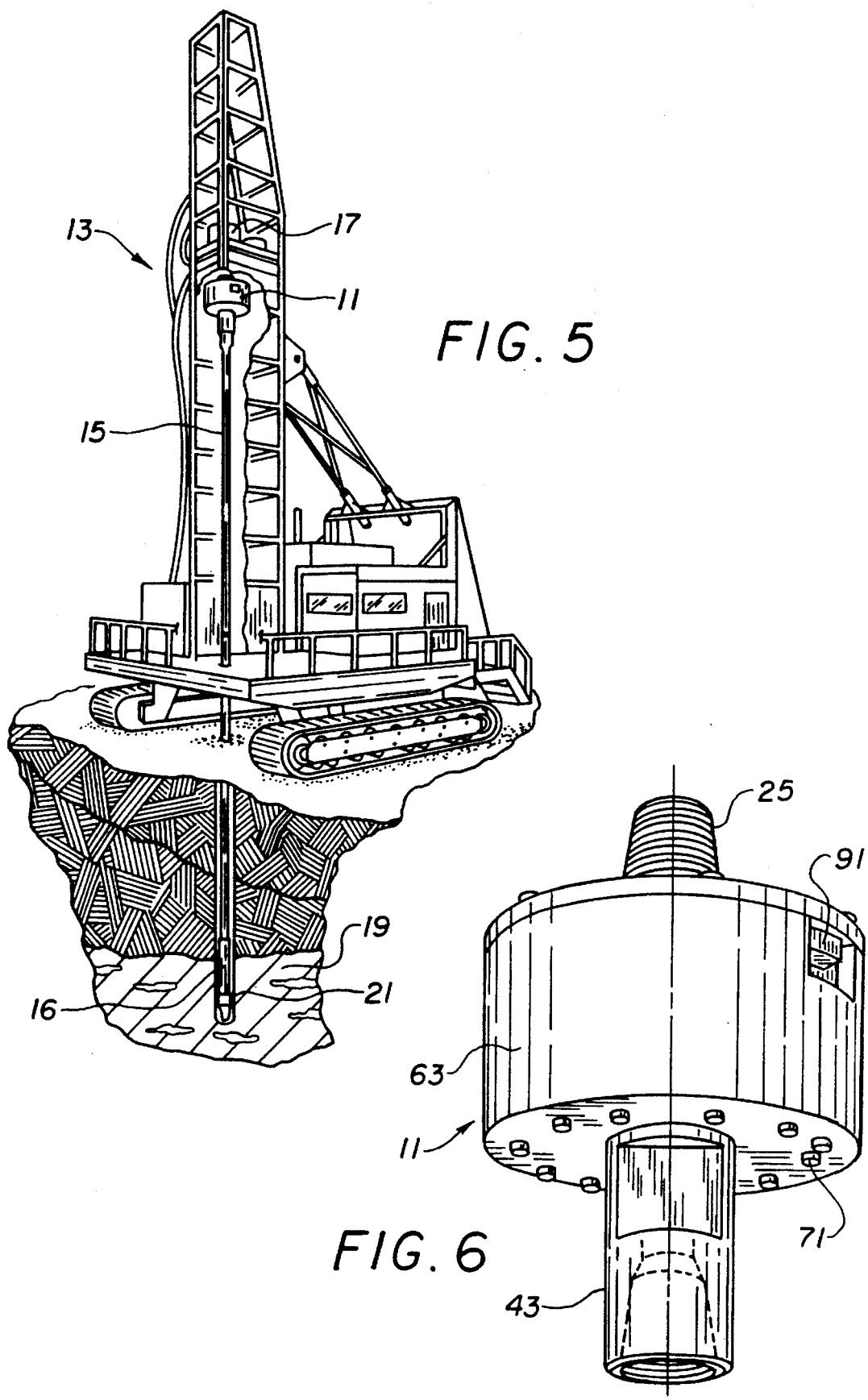

5,476,421

SHOCK ABSORBING ASSEMBLY

This is a continuation-in-part of application Ser. No. 07/800,697 filed on Dec. 2, 1991, now abandoned, which is a continuation of Ser. No. 07/571,308, filed on Aug. 22, 1990, now abandoned.

BACKGROUND OF THE INVENTION

1. Field of the Invention

The present invention relates generally to a shock absorber and vibration dampening device for a blast hole drilling machine, and more specifically to a shock absorbing assembly for absorbing axial and torsional forces during the operation of drilling machines employing down-hole hammers.

2. Description of the Prior Art

In various types of drilling operations, the drill bit is forced downward under pressure while being rotated in order to penetrate earthen formations. These drilling operations can require the application of relatively high downward force to the drill bit as well as relatively high torque.

One example is the typical rotary blasthole drill which comprises a large drilling rig to which is attached a rotary drive mechanism. Typically, the drill's rotary drive is capable of being raised and lowered along a substantially vertical axis directly above the formation to be drilled. Additionally, a length of drill pipe or drill string is connected to the rotary drive so as to extend downwardly therefrom in a substantially vertical direction. A drill bit is secured to the downward end of the drill pipe. The drill machine's rotary drive head is activated to rotate both the drill pipe and the drill bit at the desired speed. Then, the rotary drive, together with the drill pipe and bit, is lowered so that the drill bit contacts the surface of the formation to be drilled. Downward pressure is then continuously applied to the rotating drill pipe and bit to force the drill bit to cut downwardly into the formation. As the drilling operation occurs, air is forced through the interior of the drive head, drill pipe, and through the drill bit, thereby forcing cuttings out of the hole and maintaining a clear surface upon which the drill bit may operate.

As soon as the drilled hole is deep enough to accommodate the first length of drill pipe, the drill's rotary drive is disconnected from the drill pipe and raised to its original position. A second length of drill pipe is then connected between the rotary drive and the first length of drill pipe. The rotary drive is then again activated and drilling operations are continued. This procedure is repeated until a desired hole depth is achieved.

In order to eliminate the problems associated with vibration and shock to the drilling apparatus, various devices have been employed to dampen vibrations and absorb shocks during the operation of the rotary drill. These devices typically comprise a shock absorbing apparatus which is connected between the drill machine's rotary drive head and the drill pipe. In some instances, the shock absorbing device includes some type of resilient material which absorbs the vibrations and shocks, and dissipates the undesirable energy associated with the drilling operation.

U.S. Pat. Nos. 3,746,330 and 3,947,009 show a resilient coupling provided between a drive shaft and a driven shaft of a tubular drill string. A group of resilient discs are sandwiched between a series of axially-spaced drive, driven and pressure plates which surround drive and driven shaft members. Pin projections extend from the driven plate into the resilient discs while fastening means extend between the drive and pressure plates for compressing the resilient discs together and into union with the pin projections and fastening means.

U.S. Pat. No. 4,109,488 shows a shock absorbing rotary drive coupling for a rotary blasthole drill. The device includes two parallel, horizontal plates. One of the plates is connected to the rotary drive and the other is connected to the drill pipe. The apparatus further includes a resilient pad which is bonded between the two plates. The entire apparatus has a hole through its center in order to accommodate the air and fluid which is forced through the drill pipe to the drill bit.

In certain of the prior art devices, axial vibrations were absorbed by forcing the drive and driven plates closer together. For instance, the old "DRILCO" shock absorber featured an internal piston action. U.S. Pat. No. 4,571,215, issued Feb. 18, 1986, is similar in that the drive and driven plates are forced closer together. In these and similar designs, the resilient pad between the two plates was compressed, causing the resilient pad to dissipate the energy of vibration as heat. Other of the prior art devices failed to adequately respond to torsional, i.e. rotational vibrations at all and, in fact, were restricted by solid members. When subjected to torsional vibration, a shearing force was exerted on the resilient pad. Over a period of time or in response to large torsional stresses, the resilient pad was frequently broken. As a result, these devices tended to wear out within a relatively short time, thereby necessitating frequent repair or replacement. This factor substantially increased the cost of the drilling operation.

An aspect of the present invention relates to the use and effect of a tensed and stretched elastomer as a resilient member for absorbing and dampening forces. In an article entitled "Heat Build-Up of Dynamically-Loaded Engineered Elastomeric Components" that was presented at Designing With Elastomers Educational Symposium, Energy Rubber Group, Houston, Tex., Sep. 24–26, 1990, it was stated that "[t]he apparent modulus of an elastomer component in tension or compression (shear is unaffected) is a function of the inherent dynamic properties of the elastomer and a geometric design variable . . ." The article completely fails to suggest that tension has any advantages over compression. In a second article entitled "Engineering Design With Natural Rubber," published by The Malaysian Rubber Producers' Research Association (1978), it is stated that "[t]he load-deflexion curves for rubber in tension and compression are approximately linear." The articles goes on to state that "the values of Young's modulus in tension and compression are approximately equal." This would suggest that the shock absorption characteristics of rubber in tension would not provide better results than compression. The inventors have found that contrary to present understanding, the compression of elastomeric resilient materials makes the materials stiffen. The compressed resilient material, therefore, transmits some of the longitudinal impact forces and torsional forces making them less effective while in compression. Also, the compression of the resilient material makes them less effective for absorbing impact and torsional forces; their use as a shock absorbing and vibration dampening material is somewhat limited (shock absorption, as used herein, also includes vibration dampening). As explained below, an elastic material for absorbing shock through tension of the material is much more effective in the present invention than using compression of the elastic material.

It is the object of the present invention to provide a shock absorbing/vibration dampening assembly for a drilling machine which is simple and economical in design and which effectively dampens both rotational torque and axial vibrations encountered during down-hole hammer drilling operations.

Another object of the invention is to provide such a shock absorbing assembly wherein there is virtually no possibility of breaking the resilient member of the assembly.

It is also an object of the invention to provide a shock absorbing vibration dampening assembly capable of transmitting the downward pressures required on hammer-type drill bits downwardly into the formation to be drilled while simultaneously transmitting the torsional forces required for rotating the bit and while absorbing the shock and vibration of the air-operated hammer encountered during the down-hole hammer drilling operation.

SUMMARY OF THE INVENTION

The shock absorbing assembly of the invention is used in a preferred embodiment of the invention on a drilling machine to drivingly connect a drive shaft of a drilling machine to an axially aligned drill pipe or drill string with an air-operated hammer and drill bit for penetrating earthen formations. The assembly includes a drive member having a screw threaded connection or pin end at one end for matingly engaging a tubular drive shaft of a drilling machine for imparting drive energy to the drive member. The drive member has a longitudinally extending tubular portion at an opposite end thereof which communicates through the interior thereof with a tubular driven shaft. The drive member also has a upper drive flange or drive plate arranged transverse to the longitudinal axis of the drive member. The drive member actuates a driven member which in turn moves a drill pipe or drill string, which includes an air-operated hammer and drill bit.

The tubular portion of the driven member has an upper recess or bore for slidingly engaging the cylindrical exterior surface of the longitudinally extending tubular portion of the drive member. The driven member also has a driven flange or plate which is located below but spaced-apart from the upper drive flange by a preselected distance. A resilient member, pad or element surrounds the longitudinally-extending tubular portion of the driven member below the driven flange and is secured to the driven flange and to the lower driver flange as discussed below.

A housing is operationally part of the drive flange. The housing has a cylindrical sidewall portion which circumscribes at least part of the tubular portion of the driven member and the resilient member, and has a bottom wall portion or lower drive flange located below the driven flange and connected to the upper drive flange. The bottom wall portion and the sidewall portion enclose the resilient member within the housing. The resilient member is secured to the bottom wall portion of the housing and to the driven flange, whereby movement of the longitudinally-extending tubular portion of the drive member moves the bottom wall away from the driven flange and places the resilient element in tension.

The resilient member is comprised of an elastomeric member which preferably is secured to the lower drive flange and the driven flange, or sandwiched between upper and lower metal plates. The elastomeric member is preferably bonded to the respective flanges or to the metal plates by an adhesive which is strong enough for the operating conditions of the shock absorbing assembly, and not deleterious to either the resilient member or the metal flanges or plates. The metal flanges or plates should have their opposing faces coated with a primer, and an adhesive of proper thickness, which advantageously is cured in a manner parallel to that of the resilient material. Where the metal plates are used, at least one drive lug or other means can be carried on the lower flange and engages the lower plate of the resilient or elastomeric member, whereby rotational torque applied to the lower flange is imparted to the resilient element. Rotational torque applied to the resilient element from the drive member is transferred through the resilient element to the driven flange of the driven member, for turning the axially aligned driven shaft.

It is preferred that the driven flange of the driven member is generally circular in outer configuration having a peripheral edge which is sized to be received within the internal diameter of the side walls of the housing.

In one embodiment, a pair of keys are secured in a fixed manner to the side wall drive member in the plane of the driven flange and disposed about 180° from each other, and extend radially inwardly toward the longitudinal axis of the tubular portions. The driven flange has a pair of arcuate notches, each extending between a pair of shoulders. In normal operation of the device, the keys stay between the respective pairs of shoulders. However, when the drill bit gets stuck, force applied to the drive member turns the keys until they strike the shoulder and yield metal-to-metal contact. Further force applied to the drive member will be applied directly to the driven member, which is applied to the drill string and not through the resilient member.

In another embodiment, a pair of oppositely arranged ears are located on the peripheral edge of the driven flange and lie in the plane of the flange and extend outwardly from the peripheral edge. The housing is provided with a pair of oppositely arranged slots which are located approximately 180° apart in the sidewall portion thereof. The ears of the driven flange are received within the housing slots when the driven flange is assembled within the housing. The slots provided in the housing have a width which is selected to allow a predetermined degree of torque movement of the ears of the driven member within the housing slots during drilling. The slots provided in the housing have a depth which is selected to allow a predetermined amount of longitudinal movement of the driven member within the housing slots during drilling to thereby allow for elongation or compression of the resilient element within the housing.

In operation, the drilling machine applies rotary forces to the pin connection of the drive member. The drilling machines also applies vertical forces to the pin connection, and this urges the lower flange downwardly (away from the driven flange); the resistance of the drill string with the bit in contact with the earthen formation causes a resultant upward force on the driven flange. These vertical forces put tension on the resilient member and elongates it. Compressed air is transmitted through the inner bore of the tubular portion of the drive member, through the inner bore of the driven shaft and through the drill string. The compressed air causes the hammer and its attached bit to move downwardly into the earth formation; rebound forces from the reaction to the compressed air operating hammer are transmitted upwardly through the driven shaft. The upwardly transmitted forces and vibrations are applied to the resilient members under tension, which absorbs the forces and dampens the vibration. In addition the resilient member under tension returns the hammer and its bit at the end of the drill string to the workplace faster than the resilient member would if it were under compression.

Additional objects, features and advantages will be apparent in the written description which follows.

BRIEF DESCRIPTION OF THE DRAWINGS

FIG. 5 is a perspective view of a rotary blasthole drill machine having an air-operated hammer and drill bit and featuring the shock absorbing assembly of the present invention;

FIG. 6 is a side, perspective view of the shock absorbing assembly of the invention;

DETAILED DESCRIPTION OF PREFERRED EMBODIMENTS OF THE INVENTION

Figure 1:
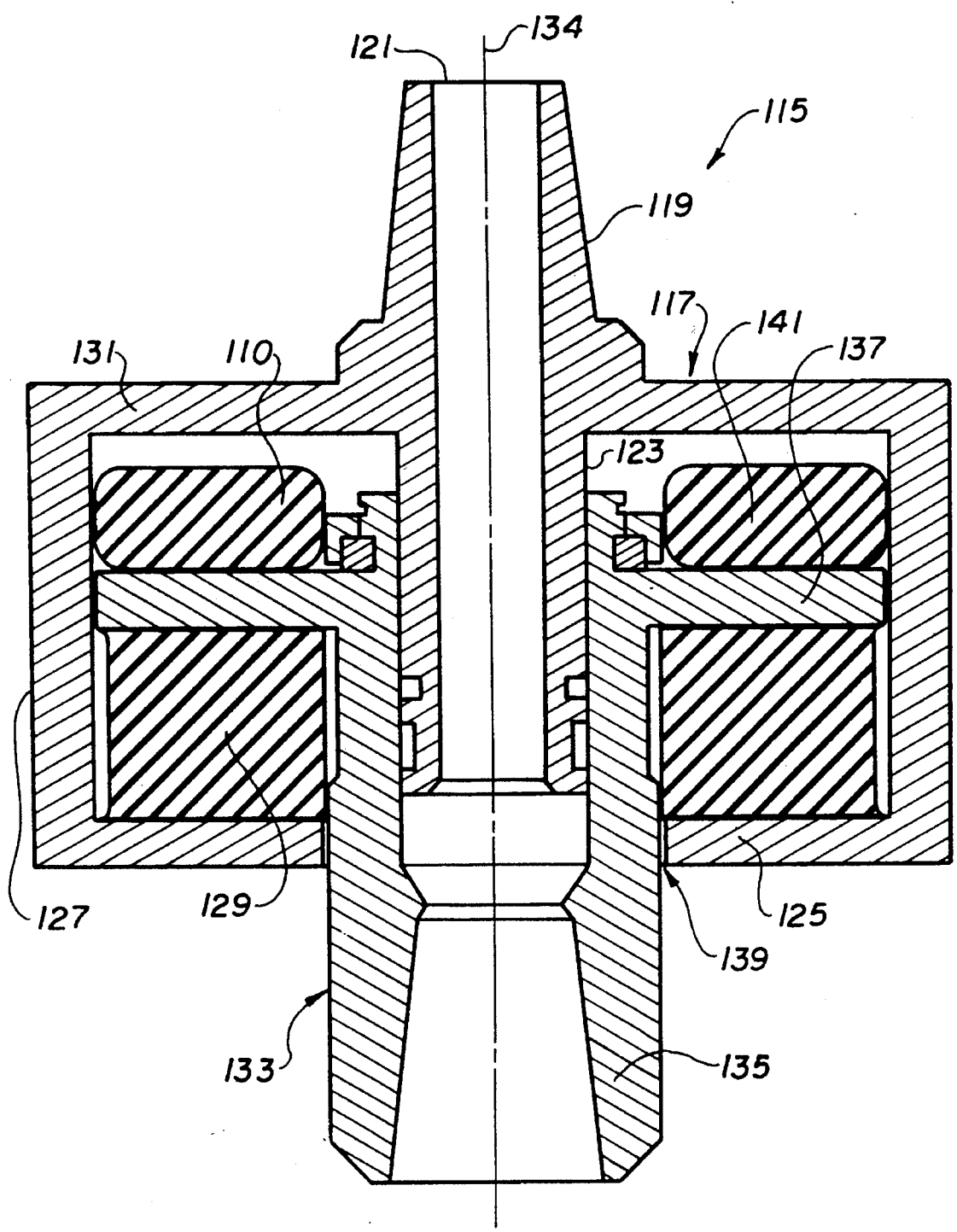
FIG. 1 is a longitudinal view, in cross-section, of a shock absorbing assembly according to the invention, in a simplified, schematic form, in a rest condition.

Turning first to FIG. 1, the shock absorbing assembly 115 in summarized schematic form is shown. Assembly 115 is in rest condition. Assembly 115 includes a drive member 117 with a connection 119 for attachment to the drive shaft of the drive head of a drilling machine. Connection 119 has a top 121 with an open tube. Drive member 117 further includes a tubular portion 123, a lower drive flange or bottom wall 125, cylindrical side walls 127, and a top or upper drive flange 131. A resilient member or pad 129, which can be an elastomeric material such as rubber, is connected to drive member 117 through its attachment to bottom wall 125.

Shock absorbing assembly 115 further includes a driven member 133 comprising a tubular portion 135 having a driven flange 137. Resilient member 129 is attached to driven flange 137 as well as to bottom wall 125 of the drive member. The drive member and the driven member are matingly engaged, with tubular portion 135 being in a slip fit with the aperture in bottom wall 125 as shown at 139, so that the driving and driven members move in a relative sliding action to elongate resilient member 129. A drill string with a hammer and bit is attached to the lower part of driven member 133. The foregoing parts have a longitudinal axis 134. A separate resilient member or spike pad 141 is provided on the driven member. No pressure is applied to resilient member 129 when assembly 115 is in a relaxed condition.

Figure 2:
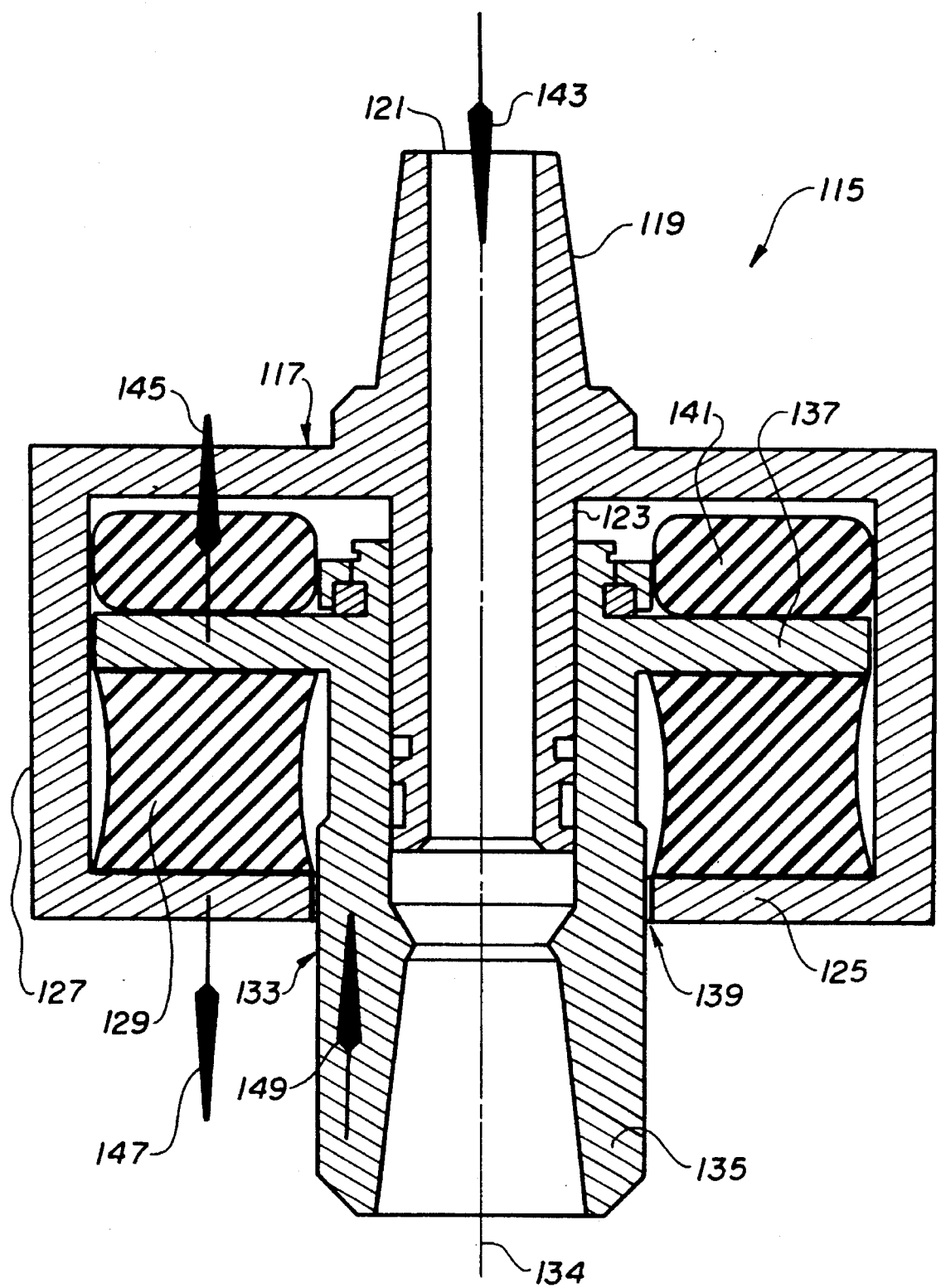
FIG. 2 shows the shock absorbing assembly of FIG. 1 in normal operation with a downward force being applied to the drive member of the assembly.

FIG. 2 illustrates shock absorbing assembly 115 under normal operation. A normal down pressure is applied to the top 121 of drive member 117 by the drive head load 143, to move drive member 117, with bottom wall 125, downwardly. This elongates resilient member 129, to invoke the optimal shock absorbing characteristics of member 129. Resilient member 129 tries to return to its relaxed state, urging the drill string with its attached drill bit into the work surface below. Arrows 145 and 147 represent the forces applied to tubular portion 135 of driven member 133 and to the driven flange 137, as the drill string with its bit perform the normal drilling operation. Elastomeric member 129 absorbs the forces indicated by arrow 149 transmitted up from the drill string with the attached bit when member 129 is in its stretched condition, generally after strains of a few percent are encountered. Elastomeric member 129 does not contact side walls 127. The stretching action of the elastomeric member enhances the shock absorbing capabilities associated with rubber elastomers or other elastomeric materials, because previously used compression of such materials limits the space into which the elastomers can expand which creates rigidity of these elastomers.

Figure 3:
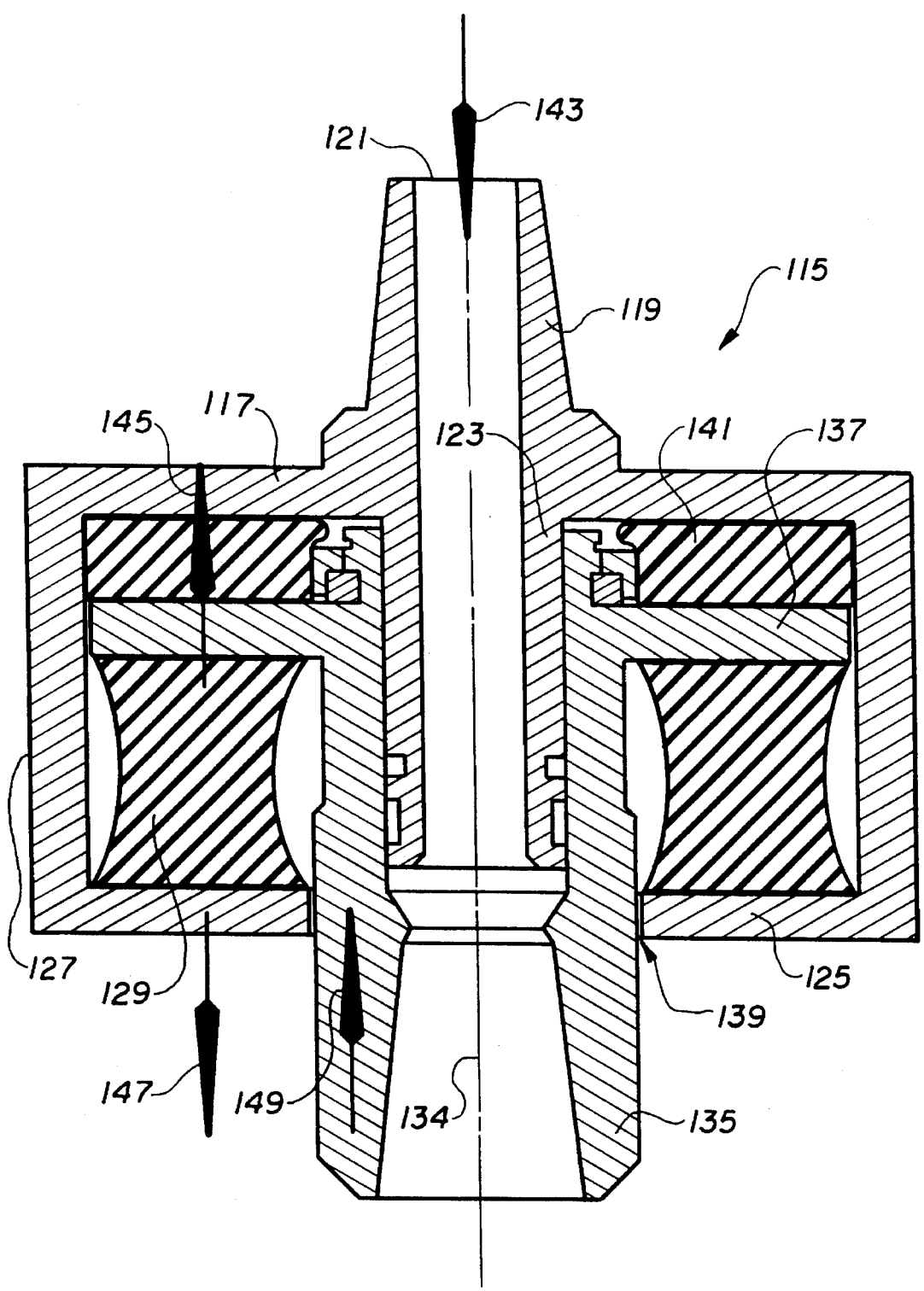
FIG. 3 shows the shock absorbing assembly of FIGS. 1 and 2 with the downward force placing the assembly in an extreme condition.

FIG. 3 depicts shock absorbing assembly 115 in which down pressure is experienced under an extreme drilling condition, when the drill string with its bit are forced up. Here, the tensile forces on member 129 are so high that member 129 is stretched by a higher-than-normal amount, and driving member 117 and driven flange 137 compress spike pad 141 to absorb shock which escape member 129.

Figure 4:
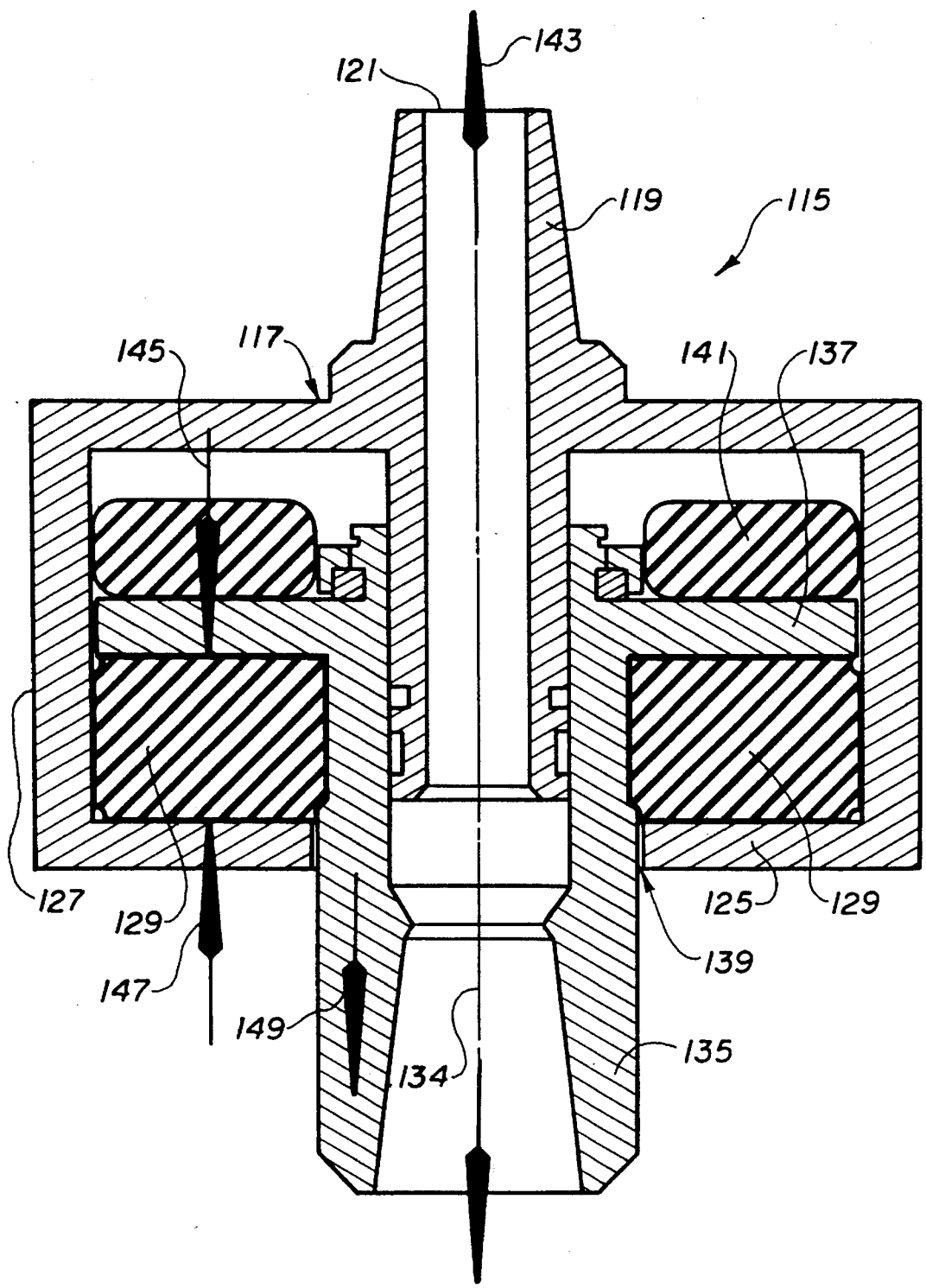
FIG. 4 shows the assembly of FIGS. 1–3 with the drill bit in a stuck condition.

A stuck drill bit situation is illustrated in FIG. 4. Here, an upward force 143 must be applied to drive member 117 to overcome force 149 exerted by the drill string with hammer and bit. This urges drive member 117 against driven flange 137 to compress resilient member 129 until the drill bit is freed. This is contrary to the normal operation of assembly 115, since member 129 is compressed and binds against walls 127 and provides greatly degraded shock absorption characteristics, but greatly aids in extracting the stuck bit.

FIGS. 5–11 show a preferred embodiment of the invention, with further details set forth. FIG. 5 shows the shock absorbing assembly 11 of the invention as it would be used with a typical top-drive rotary blasthole drill machine 13. The assembly 11 (shown in isolated fashion in FIG. 6) is connected between the drill pipe 15 and the rotary drive head 17 of a drilling machine 13. The activation of the rotary drive head 17 causes the shock absorbing assembly 11 and the drill pipe 15 to rotate, thereby cutting a borehole downwardly through the formation 19. An air-operated hammer 16 and its hammer-type drill bit 21 are carried on the lower end of the drill string 15. The hammer-type drill bit 21 is pressed into the earthen formation 19 by the vertical reciprocating action of the air-operated hammer, thus creating the axial force to the bit resulting in a chipping action by the bit against the formation. High pressure air from a compressor located at the surface (not shown) is transmitted from the compressor through the interior of the drill pipe 15 to the hammer 16. Air pressure of about 300–400 psi with appropriate valving causes the hammer 16 to reciprocate on the bit with the shock of reactionary impact being telegraphed up the drill string 15 to the shock absorbing assembly 11. As the hammer 16 begins to reciprocate, the rotary drive head mechanism 17 begins to rotate the shock absorbing assembly 11, drill string 15, hammer 16 and bit 21. Upward force within the hammer 16 is further increased by bias means, such as a spring, urging the drill string upwardly. This rotational motion also causes torsional shock due to ground deformations which are transmitted to the shock absorbing assembly 11.

Figure 7:
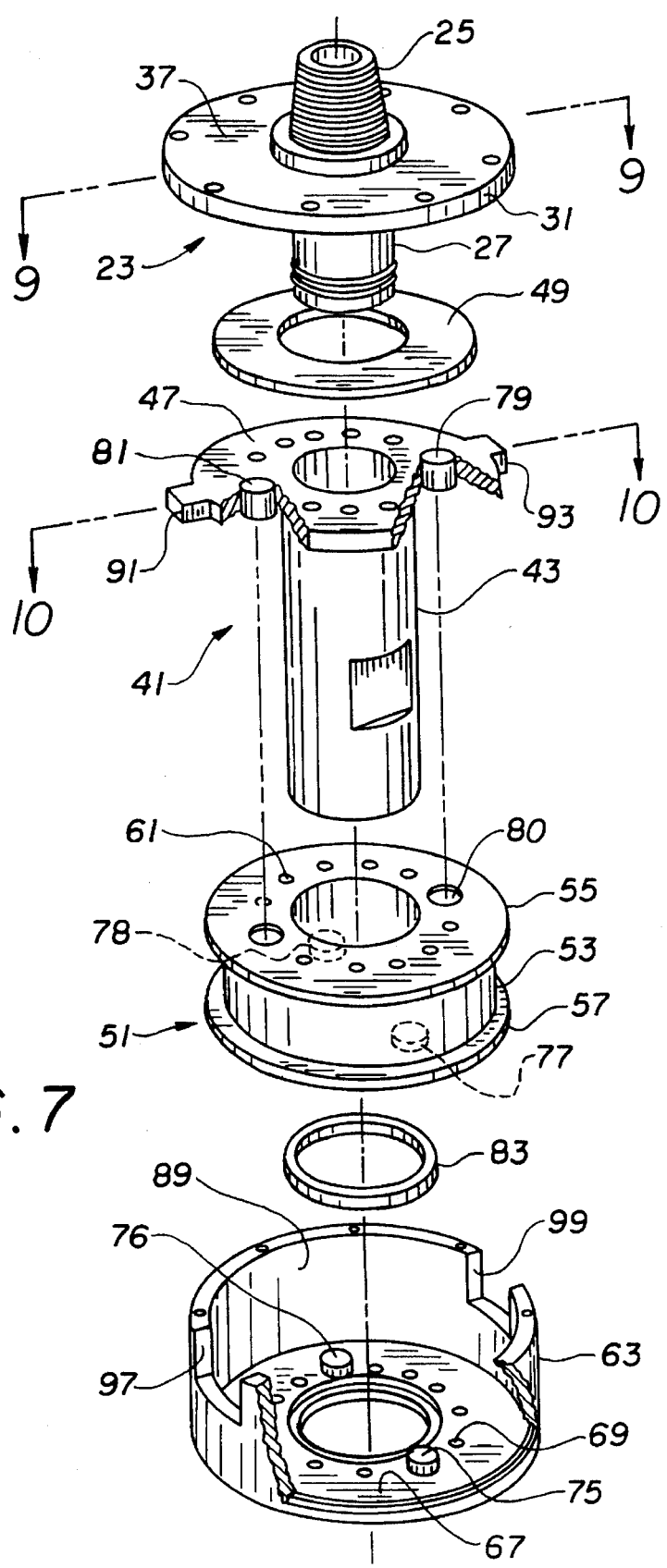
FIG. 7 is an exploded view of the principle components of the shock absorbing assembly according to one embodiment of the invention.
Figure 8:
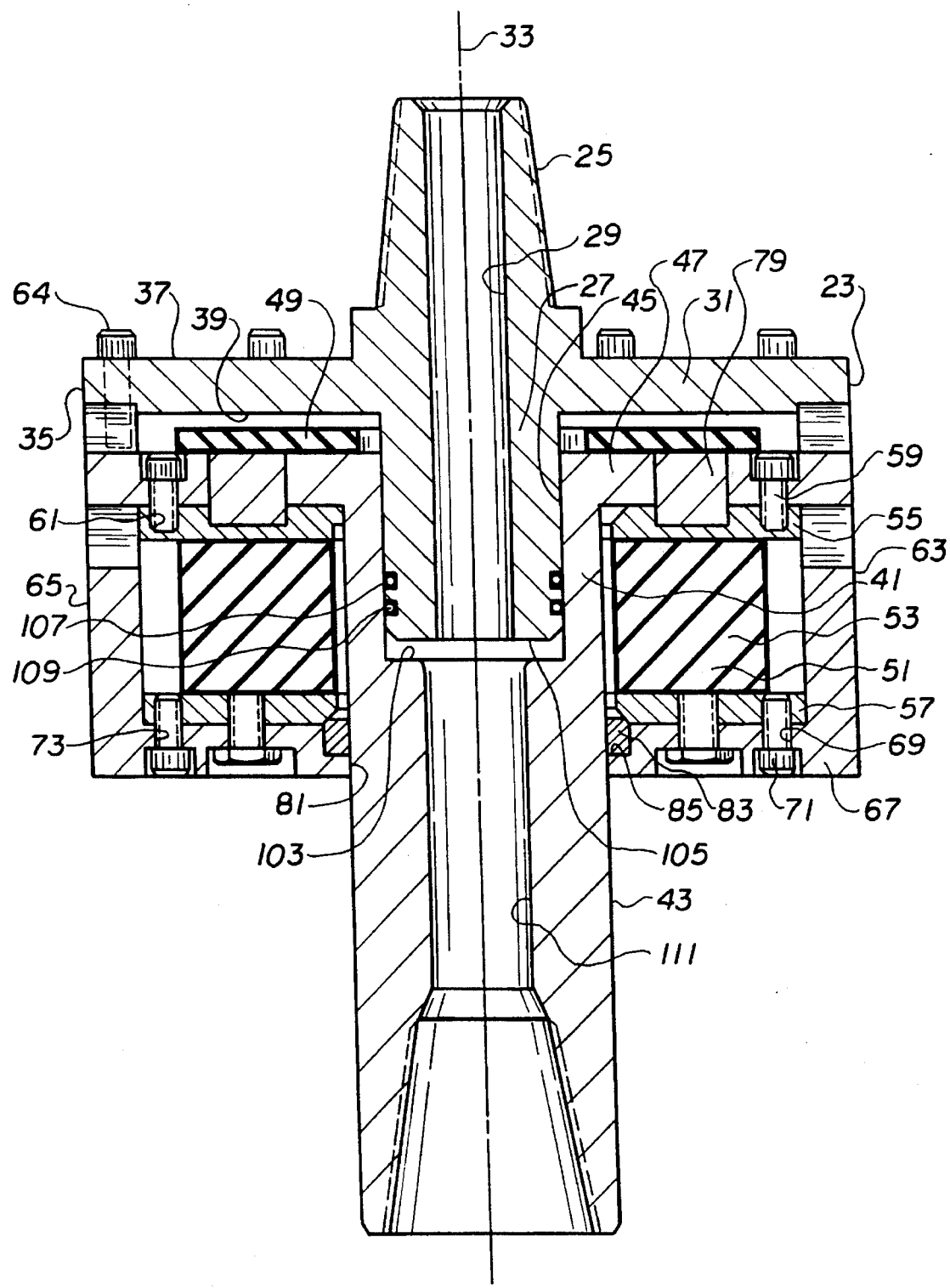
FIG. 8 is a longitudinal view, in cross-section, through the shock absorbing assembly of the invention taken generally along lines VIII—VIII in FIG. 7.
Figure 9:
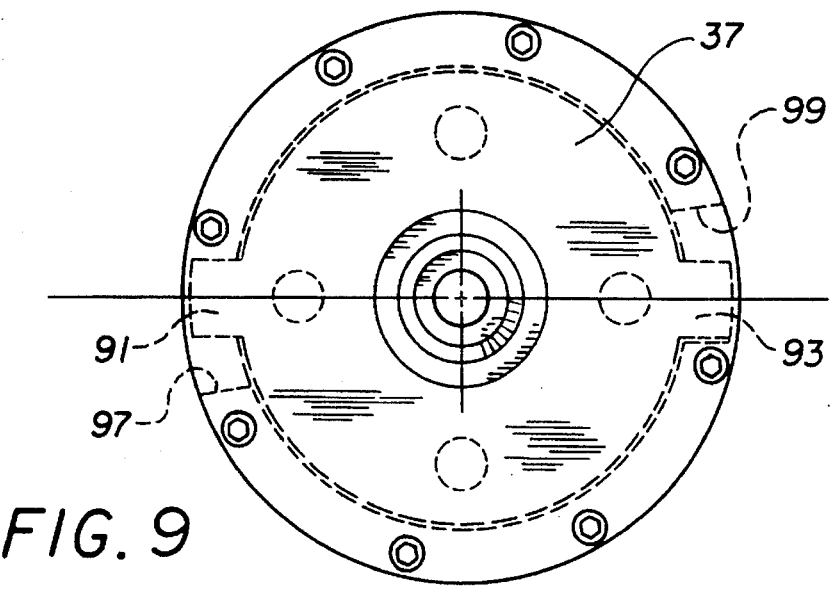
FIG. 9 is a top view of the shock absorbing assembly of FIG. 8.

Turning to FIGS. 7 and 8, the shock absorbing assembly 11 includes a drive member 23 having a screw threaded connection, such as pin end 25 at one extent for matingly engaging a drive shaft of a drilling machine drive head 17, such as the blasthole drill machine 13 (FIG. 5) for imparting drive energy to the drive member. The drive member has a longitudinally extending tubular portion 27 which communicates through the interior bore 29 thereof with the drive shaft of the drilling machine (not shown). In this way, air pressure from the compressor located at the surface can be transmitted through the interior bore 29. The drive member 23 also has a drive flange 31 which is arranged transverse to the longitudinal axis 33 of the drive member. The drive flange 31 is generally circular having an outer peripheral edge 35, a planar upper surface 37 and a planar lower surface 39.

The shock absorbing assembly also includes a driven member 41 having a tubular portion 43 which is axially aligned with the tubular portion 27 of the drive member. The tubular portion 43 of the driven member has an upper recess or bore 45 (FIG. 8) for slidingly engaging the longitudinally extending tubular portion 27 of the drive member 23. The driven member 43 also has a driven flange 47 which is located below, in a parallel plane, but spaced-apart from the drive flange 31 by a preselected distance.

A spike pad 49 is carried by the driven flange 47, the resilient pad 49 being located in the space between the driven flange 47 and the drive flange 31 of the assembly to cushion impact of the drive flange on the driven flange.

A resilient member 51 surrounds the longitudinally extending tubular portion 43 of the driven member 41 below the driven member flange 47, the resilient member 51 being secured to the driven flange 47. Preferably, the resilient member 51 is comprised of an elastomeric member 53 formed from, for instance rubber, sandwiched between upper and lower metal plates 55, 57. The elastomeric member 53 is bonded to the metal plates 55, 57. A suitable elastomeric element is commercially available from DuraQuest, Inc., Route 2, Conroe, Tex. 77303. The bond should be strong enough for the operating conditions of the shock absorbing assembly, and deleterious to the resilient member or the plates.

More particularly, the nature of the bond between resilient member 51 and metal plates 55, 57 is optimized. Elastomeric bonding systems have been known for many years. In the present case, solvent based, chemically activated bonds using polymers with cross-linking agents are used. Thermally activated curing agents are preferred. The metal surface to be bonded is cleaned, and the surface is provided with a tooth or anchor pattern texture. The metal surface is then degreased, and a solvent bath further cleanses the metal. The adhesive and its primer (two-coat system) with a proper millage (thickness) according to the expected load (with a safety factor) is applied. The primer adhesive and the resilient material are cured in parallel with each other, to optimize their bond. Appropriate adhesives can be CHEM-LOK adhesives from Lord Chemical Company, or a similar adhesive from Fixon Corporation.

The resilient member 51 can conveniently be secured to the driven flange 47, as by a plurality of bolts 59 which are received within counterbored openings provided around the circumference of the driven flange 47 and which are received within mating threaded bores 61 provided in the upper metal plate 55 of the resilient member 51. Preferably, multiple bolts 59 are provided at equally spaced circumferential locations about the periphery of the driven flange 47.

A housing 63 is engageable with the drive flange 31 by means of connecting bolts 64. The housing has a cylindrical sidewall portion 65 which circumscribes the tubular portion 43 of the driven member 41 and the resilient member 51. The housing 63 also has a lower drive flange or bottom wall portion 67 which together with the sidewall portion 65 enclose the resilient member within the assembly.

The resilient member 51 (FIG. 7) is secured to the bottom wall portion 67 of the housing 63, whereby movement of the longitudinally extending tubular portion of the driven member 41 in the direction of the drive member 23 places the resilient member 51 in tension. Preferably, the housing bottom wall portion 67 includes a plurality of circumferentially spaced counterbored openings 69 for receiving screws 71 (FIG. 8), the screws 71 being threadedly engaged within mating bores 73 provided within the resilient member lower metal plate 57.

At least one drive lug 75 is carried on the housing bottom wall portion 67 (FIG. 7) and engages the lower metal plate 57 of the resilient member 51, whereby rotational torque applied to the housing 63 by the drive member 23 is imparted to the bottom wall portion 67 and through the lower metal plate 57 to the resilient member 51. Preferably, a plurality of drive lugs 75, 76 are received within recesses 77, 78 provided at spaced circumferential locations in the lower metal plate 57.

Similarly, at least one driven lug 79 is carried on the driven flange 47 of the driven member 41 and engages the upper metal plate 55 of the resilient element 51 in a recess 80, whereby rotational torque applied to the resilient member 51 is applied through the driven flange 47 to the driven member 41 for turning the axially aligned driven shaft. As shown in FIG. 7, the drive lugs 75, 76 and driven lugs 79, 81 are preferably offset at assembly, for instance 180° when pairs of drive and driven lugs are utilized.

The housing bottom wall portion 67 (FIG. 8) has a central opening 81 for receiving the longitudinally extending tubular portion 43 of the driven member 41. Preferably, a wear bushing 83 formed of a soft metal, such as bronze, is received on a shoulder 85 provided within the interior of the housing bottom wall portion 67. The wear bushing 83 contacts the tubular portion 43 of the driven member as the driven member slidingly moves within the housing 63.

Figure 10:
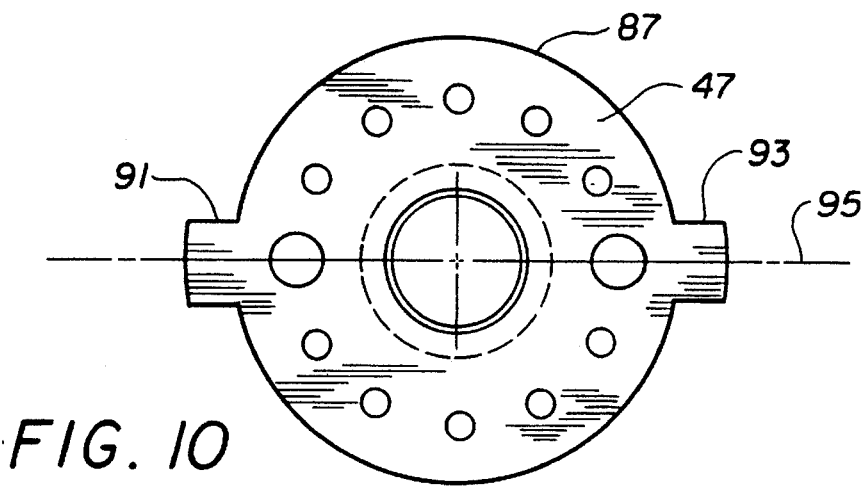
FIG. 10 is a top view of the driven member of the assembly.

As best seen in FIGS. 7 and 10, driven flange 47 of the driven member 41 is generally circular in outer configuration having a peripheral edge 87 which is sized to be received within the internal diameter of the interior bore 89 (FIG. 7) of the housing 63. A pair of oppositely arranged ears 91, 93 are located on the peripheral edge 87 of the driven flange 47, and lie in the plane of the flange, extending outwardly from the peripheral edge 87. As shown in FIG. 10, each ear 91, 93 lies on an imaginary axis 95 which bisects the plane of the driven flange 47.

Figure 11:
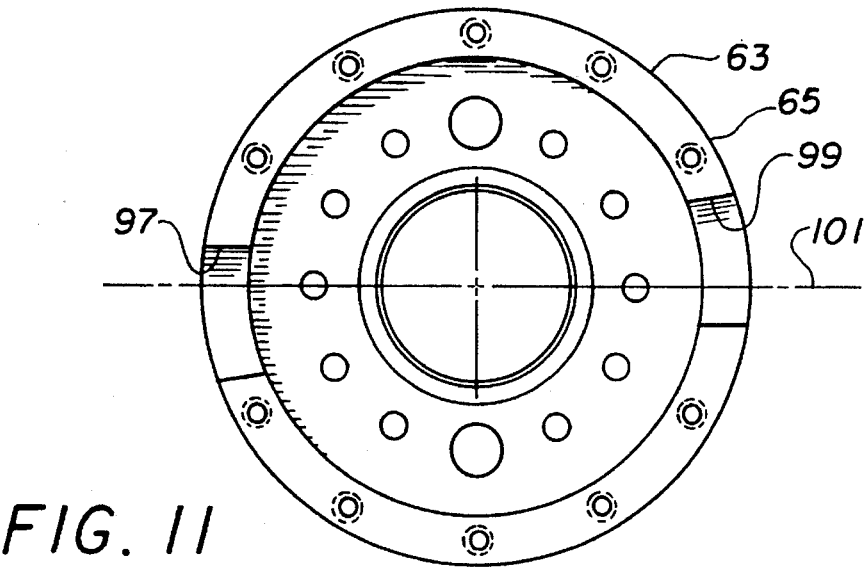
FIG. 11 is a top view of the housing of the assembly.

The housing 63, as shown in FIG. 11, is preferably provided with a pair of oppositely arranged slots 97, 99 which are located approximately 180° apart in the sidewall portion 65 of the housing 63. Preferably, the slots 97, 99 are provided at an approximate 20° angle off center from the imaginary axis 101 which bisects the center of the longitudinal axis of the housing 63. The ears 91, 93 of the driven flange 47 are received within the housing slots 97, 99 when the driven member 47 is assembled within the housing 63.

The slots 97, 99 provided in the housing 63 have a width which is selected to allow a predetermined degree of torque movement of the ears 91, 93 of the driven member 47 within the housing slots during drilling. Preferably, a clearance is left between the ear and slot width when the drilling machine is idle. This clearance is consumed when the rotation of the drill string is reversed to break out the threaded connection on the drill string. The slots 97, 99 in the housing also have a depth which is selected to allow a predetermined amount of longitudinal movement of the driven member 41 within the housing slots during drilling to allow for elongation or compression of the resilient member 51 within the housing 63.

As shown in FIG. 8, the upper recess or bore 45 of the driven member 41 includes an internal shoulder 103 for contacting a lower extent 105 of the tubular portion 43 of the drive member 23 as the resilient member 51 is placed in tension during drilling, thereby limiting the elongation of the resilient element. A plurality of O-ring seals 107, 109 are provided on the exterior of the tubular portion 27 of the drive member 23 for forming a sliding seal within the bore 45, whereby air pressure and fluids supplied through the interior bore 29 are communicated through the interior bore 111 of the driven member 41 and through the drill string 15 to the hammer 16 and drill bit 21.

The operation of the shock absorbing assembly of the invention shown in FIGS. 5–11 will now be described. As the hammer-type drill bit 21 is pressed into the earth by the vertical axis force created by the rotary drill mechanism 17, the downward thrust causes the driven member 41 to be driven upwardly relative to drive member 23 as viewed in FIG. 8. Upward force on the driven member 41 causes the elastomeric member 51 to elongate, placing the element in tension. High pressure air is transmitted from the air compressor at the surface through the interior bore 29 of the drive member 23 and through the interior bore 111 of the driven member 41 through the drill string to the air-operated hammer 16 and the drill bit 21. As the hammer begins to reciprocate, shocks from the impact are telegraphed up the drill string 15 to the tubular portion 43 of the driven member 41 which transfers the shocks to the resilient member 51. As the hammer begins to reciprocate, the rotary drive mechanism 17 begins to rotate the shock absorbing assembly 11, drill string 15, hammer 16 and bit 21. This rotation causes shocks due to ground deformation down hole to be transmitted back upward to the resilient member 51 in FIG. 8. The lower metal plate 57 of the resilient member 51 is bolted to the housing bottom wall portion 67 and is mated to the housing by means of drive lugs 75 which convey these rotary torque forces into resilient member 51 where they are absorbed. As drilling proceeds, vertical and rotary movements of the drill string 15 are allowed due to the slip-fit of the tubular portion 27 of the drive member 23 within the recess 45 of the driven member 41. Since the resilient member is in tension and has an elongated configuration, the telegraphed forces relieve some of this tension. The resilient member dampens more impact shocks than would a resilient member in compression.

By providing connecting bolts and driven lugs in the upper metal plate 55 of the resilient member 51 and mating these elements with the driven flange 47, the shock absorbing assembly can also compensate for reverse acting vertical forces which act to compress the elastomeric member 53 of the resilient member 51. These conditions can exist when drilling at great depths causes the weight of the drill string 15 to produce a downward force on the tubular portion 43 of the driven member 41 or during off-drilling conditions. The rotary torque forces on the assembly are not changed.

The oppositely arranged ears 91, 93 (FIG. 7) which are contained within the mating slots provided in the housing 63 allow for torque movement of the assembly during drilling and allow for elongation or compression of the elastomeric member 51 within the housing 63 while acting to prevent the application of excessive rotary torque to the resilient element 51, causing premature failure of the element.

Figure 12:
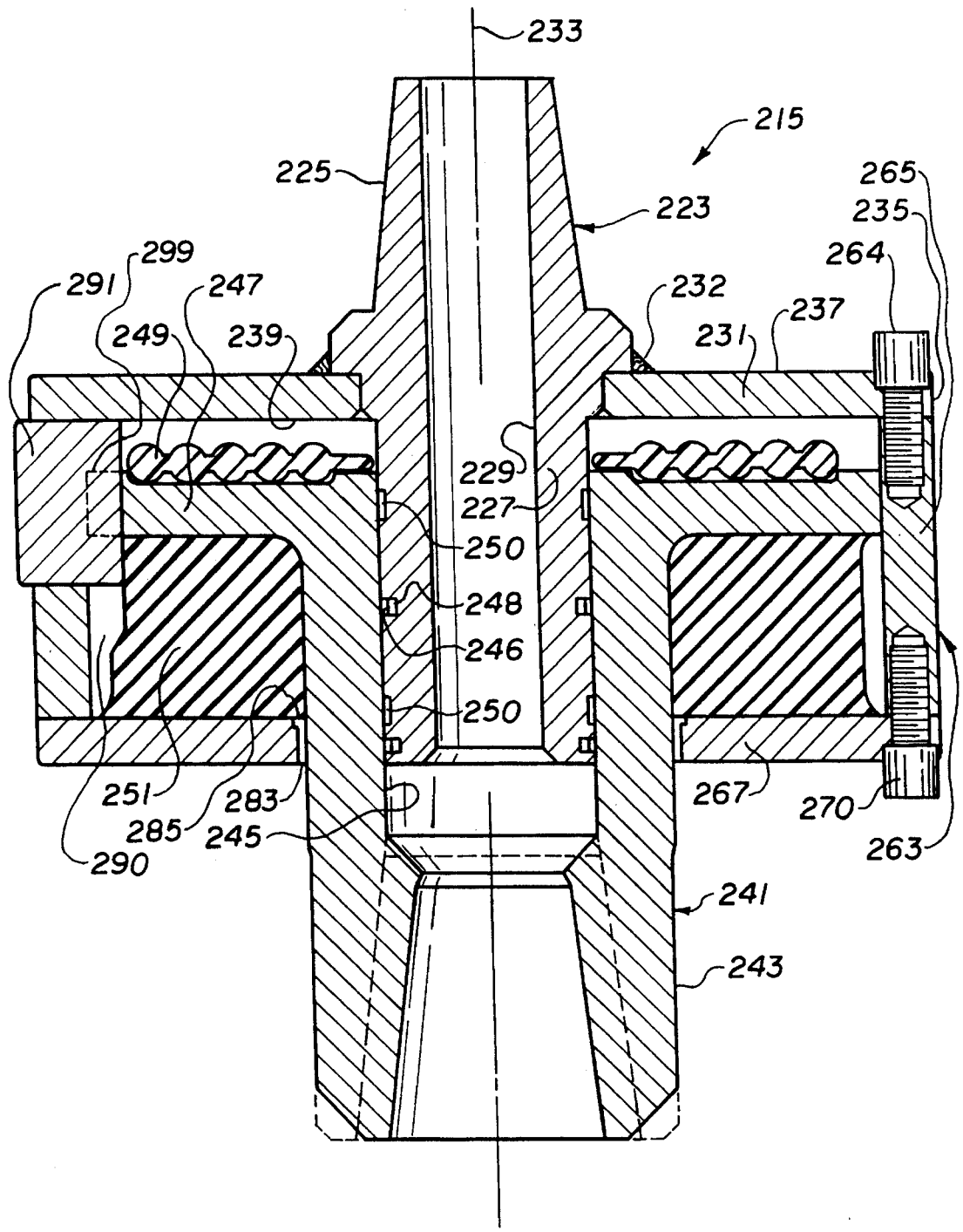
FIG. 12 is a cross-section of a second embodiment of the invention, taken along the line 12—12 in FIG. 13.
Figure 13:
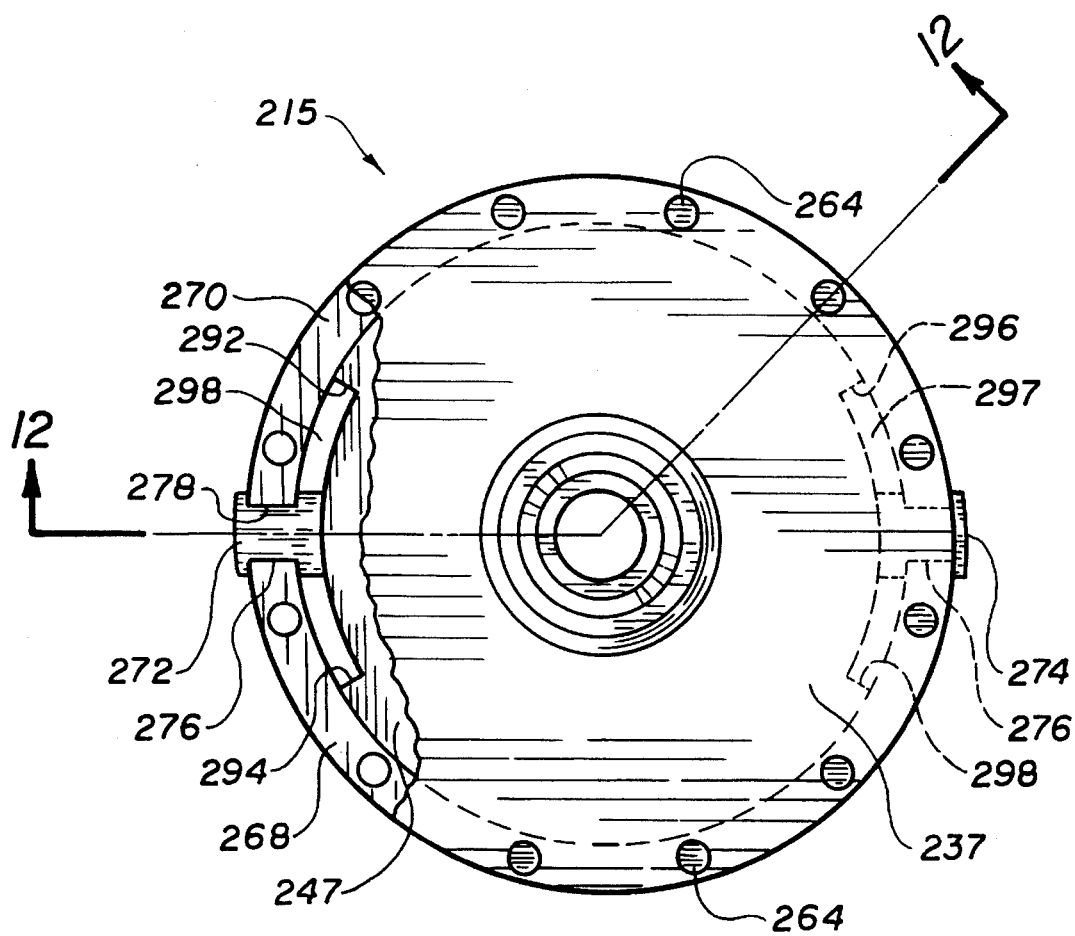
FIG. 13 is a top end view of the driven member of the device shown in FIG. 12.

A revised, preferred embodiment over that shown in FIGS. 5–11 is shown in FIGS. 12 and 13. This embodiment is a shock absorbing assembly 215, and is fundamentally the same as the embodiment shown in FIGS. 5–11. Similar components are provided with the same numbers, in a 200 series of numbers. (Item 15 in FIGS. 5–11 is shown as item 215, for example.) Thus, a drive member 223 has a pin end or pin connection 225 and a tubular drive portion or member 227 which has an interior bore 229. Drive member 223 extends along almost the full length of the driven member. A drive flange 231 is welded to tubular member 227 as shown by a weld 232. The drive member and the shock absorbing assembly have a longitudinal axis 233. Drive flange 231 has a peripheral edge 235 with an upper planar surface 237 and a lower planar surface 239. A driven member 241 includes a tubular portion 243 with an upper recess or bore 245, and the exterior part of tubular portion 227 of drive member 223 slides along the surface of bore 245 during the operation of assembly 215. A pair of seal rings 246, each with a Teflon cover 248, and a pair of bearings 250, all disposed in cylindrical channels in the exterior wall of tubular drive portion 227, helps enable the sliding motion with a tight seal. The driven member 241 further includes a driven flange 247 which is preferably integral with tubular driven portion 243.

A resilient member or spike pad 249 is positioned on driven flange 247 and is disposed between driven flange 247 and drive flange 231, for cushioning the impact of the drive flange and the driven flange when extreme down pressure is exerted on the shock absorbing assembly. The spike pad functions as described earlier. Spike pad 249 includes concentric and attached elastomeric cylinders disposed about axis 233, and is so configured to fit in the space between drive flange 231 and driving flange 247, and performs the same functions as pad 49 in FIGS. 5–11.

As in the previous embodiment, an important part of this embodiment is the resilient member 25 1 which surrounds much of the tubular portion 243 of the driven member 241. Member 251 is located below driven member flange 247. Member 251 is preferably comprised of the elastomeric member 53 as described earlier with respect to FIGS. 5–11. Adhesive bonds secure member 251 to a lower drive flange 267 as described below, and to driven flange 247. This eliminates metal plates 55, 57 discussed earlier, to reduce the cost of the product.

Further included is a housing 263 having cylindrical side walls 265 which goes around tubular portion 243 of driven member 241 and resilient member 251. The housing further includes a lower drive flange or bottom wall 267. The bottom flange 267 is bolted to side wall 263 by bolts 270 threaded into aligned bolt holes of upper-drive flange 231 and side wall 265; the bolt holes in flange 267 can be at least partially counterbored so that the heads of bolts 270 extend into the holes in bottom wall 267. Top flange 23 1 is attached to side wall 265 by bolts 264 which extend through threaded aligned holes in the flange and wall, and the heads of bolts 264 are preferably at least partially countersunk. The inner end of lower drive flange 267 is spaced apart from driven member 241, and rests on a bushing 283. Bushing 283 is made of soft metal, such as bronze, and rests on a shoulder 285 on lower driver flange 267.

FIG. 13 shows a top view of the shock absorbing assembly 215. Drive flange 237 includes bolts 264 disposed equi-angularly around the flange 237, near its periphery.

As discussed earlier with respect to FIGS. 5–11, torque applied to driven flange 247 relative to lower flange 267 causes elastomeric member 251 to twist, thus absorbing torsional shock. However, when the drill bit gets stuck, it is necessary to impose extreme torque on lower drive flange 267 to free the bit. This extreme torque is accomplished by metal-to-metal contact. Side wall 265 is essentially a cylinder having two slots 276, which are 180° opposed. A pair of keys 272 and 274, which each have two vertical notches 278 for receiving the vertical walls of slots 276 as the keys are inserted in the slots, as shown in FIG. 13. Keys 272, 274 are thus 180° opposed. Driven flange 247 has a pair of peripheral arcuate slots 297 into which keys 272, 274 extend, the slots terminating in radially extending end walls 292, 294, 296 and 298. If the driven flange 247 rotates far enough with respect to keys 272, 274, the keys will engage the foregoing end walls and achieve metal-to-metal contact. Further torque placed on driven flange 247 by the drive member is not absorbed, but rather is imparted on the drill string, hammer and bit, for freeing the bit.

The embodiment shown in FIGS. 12 and 13 allows for limited longitudinal movement of driven member 241 with respect to drive member 223, when extreme downward pressure is applied. Accordingly, resilient member 251 is contoured beneath keys 272, 274 so that the key can move longitudinally for the maximum distance defined by the uppermost top surface 299 of driven member 247 and the bottom surface 239 of upper drive flange 231. This contour is identified at 290 in FIG. 12.

The shock absorbing assembly of FIGS. 12 and 13 cost less to produce and assemble because it has fewer parts than that of FIGS. 1–7. There are fewer connecting bolts, no plate assemblies connected to resilient member 251 and there are no drive lugs. The operation of the embodiment shown in FIGS. 12 and 13 is essentially the same as that discussed in the earlier figures and will not be repeated here. Reference can be made to the earlier discussion of the operation for a full understanding of the embodiment shown in FIGS. 12 and 13.

The invention described above has important advantages over the prior art. The shock absorbing assembly of the invention is simple in design and economical to manufacture. The shock absorbing assembly absorbs both rotary and axial shocks along with vibrations transmitted from the bit during drilling operations, thereby lengthening the life of the drill bit and the life of the associated drilling equipment. The shock absorbing assembly absorbs both tension and compression forces acting on the elastomeric member of the resilient element, thereby prolonging the life of the element.

While the invention has been shown in only one of its forms, it is not thus limited but is susceptible to various changes and modifications without departing from the spirit thereof.

We claim:

1. A shock absorbing assembly for absorbing shocks and vibrations of a drilling machine utilizing an air-operated hammer, the drilling machine having a drive head for applying downward and torsional forces for transmission to the hammer and drill bit connected to a drill string downwardly into the earth, said shock absorbing assembly comprising:

upper drive member means for receiving and transmitting downward and torsional forces from the drilling machine to the drill string, hammer and the drill bit for drilling in a workplace, said drive member means including:

connection means for operative connection to the drive head of the drilling machine to receive forces to the drive head;

tubular drive means for transmitting compressed air from above the ground downwardly to drive the hammer, said tubular drive means having internal bore means for carrying compressed air downwardly to the drill string, said bore means having a longitudinal axis;

upper drive flange means extending radially outwardly from an upper part of said tubular drive means for transmitting forces applied to said tubular drive means; and lower drive flange means extending radially inwardly towards the longitudinal axis from a lower part of said drive member means for moving in response to forces applied to said member means, said lower drive flange means having a free inner periphery portion;

lower driven member means for receiving compressed air from said drive means and for transmitting compressed air to the drill string, said driven member means including:

tubular driven means having a bore coaxial with said longitudinal axis for transmitting compressed air from said tubular drive means to the drill string; and driven flange means extending radially outwardly from said tubular driven means and located between said lower drive flange means and said upper drive flange means, for moving with said tubular driven means relative to said drive member means in response to forces placed on driven member means, said driven flange means and said lower drive flange means being moved apart as the driven member means moves the drill string into the earth for transmitting forces and vibration from said tubular driver means;

resilient means operatively secured to said lower drive flange means and to said driven flange means for absorbing forces and vibration;

said resilient means being placed under tension when force is applied to said drive member means and said lower driven flange means to move said lower drive flange means and said driven flange means apart, to tension and elongate said resilient means, the tensioned resilient member absorbing shocks and vibrations generated during the operation of the drilling machine.

2. A shock absorbing assembly according to claim 1 and further including spike pad means for absorbing shocks above a certain level and in addition to shocks absorbed by said resilient means, disposed on said driven flange means between said driven flange means and said upper drive flange means, said driven flange means urging said spike pad means against said upper drive flange means in response to extreme down pressure on said drive member means, to compress said spike pad means.

3. Shock absorbing means according to claim 1 and further comprising:

rigid key means attached to and movable with one of said drive member means and said driven member means, and disposed radially outwardly from the longitudinal axis, for engaging the other of said driver member means and said driven member means to put force on said other means; and key receiving means attached to the other of said drive member means and said driven member means, and located in the possible path of movement of said key means, for being engaged by said key means;

wherein when said driven member means is substantially immovable when the drill bit is in a stuck condition in the workplace, said drive member means is rotatable about the longitudinal axis to place said key means and said key receiving means in direct operative contact to impose rotational force on said driven member means to urge the drill bit out of the stuck condition.

4. Shock absorbing means according to claim 3 wherein said key means are attached to said drive member means, and said key receiving means are slot means having radial end portions in said driven flange means, said key means engaging the end portions of said slot means when the drill bit is in a stuck condition in the workplace and rotational forces are applied to said drive member means.

5. Shock absorbing means according to claim 4 wherein said drive member means further includes side wall means interconnecting the outer peripheries of said upper drive flange means and said lower drive flange means, said key means are attached to said side wall means, and said slot means are in said driven flange means opposite said key means, the arcuate length of said slot means about the longitudinal axis of said driven flange means being long enough to enable the twisting of said driven flange means about the longitudinal axis but short enough to prevent the breaking of said resilient member means as said driven flange means twists relative to said side wall means.

6. A shock absorber according to claim 5 wherein spacing means are provided for enabling said key means to move longitudinally within a predetermined limit in response to longitudinal axial forces placed on said drive member means.

7. A shock absorbing assembly according to claim 6 wherein said key means extends radially inwardly from said drive member means for moving relative to said slot means, and said slot means is dimensioned to allow the relative rotation of said driven member means relative to said drive member means when torsional forces are applied to said drive member means, and to allow the relative longitudinal movement of said drive member means to said driven member means in response to the application of longitudinal forces to said driver member means.

8. A shock absorbing assembly according to claim 6 wherein said key means are two keys disposed approximately 180° apart around the longitudinal axis.

9. A shock absorbing assembly according to claim 1 wherein said resilient means is bonded to said lower drive flange means and to said driven flange means.

10. A shock absorbing assembly according to claim 1 wherein said drive member means includes side wall means for interconnecting said upper drive flange means and said lower drive flange means, said side wall means extending around said resilient means and not contacting said resilient means when said resilient means is under tension.

11. A shock absorbing member according to claim 10 wherein said side wall means comprises transversely extending key means for transmitting torsional forces placed on said drive member means; and said driven member means has arcuate slot means defined by end walls, said key means extending into said arcuate slot means, the end walls of said slot means being engageable by said key means for limiting rotation of said driving member means;

said key means engaging said end walls when the drill bit is stuck, and torsional forces applied to said drive me:tuber means impart torsional forces to said driven flange means for freeing the stuck drill bit.

12. A shock absorbing assembly for absorbing axial and torsional forces and vibrations of a blast hole drilling machine employing a down-hole air hammer connected to a drill string, said shock absorbing assembly comprising:

a drive member including
a tubular drive portion having a bore for transmitting pressurized air;
a connection portion for connection to a drive shaft of a drilling machine; and
a first drive wall extending transversely to said tubular drive portion; a driven member including
a tubular driven portion having a bore in alignment with the bore of said tubular drive portion for transmitting pressurized air in cooperation with the bore of said tubular drive portion;
a connection portion for connection with a drill string disposed in the earth; and
a driven wall extending transversely to said tubular driven portion, and spaced from and opposite to said first drive wall, operation of the down-hole air hammer generating oppositely directed axial forces to urge said first drive wall and said driven wall apart; and
a first resilient member disposed between and operatively connected to said first drive wall and said driven wall, said first resilient member being placed in tension in response to the urging apart of said first drive wall and said driven wall, and said first resilient member under tension absorbing the axial and torsional forces and vibration generated by said drilling machine.

13. A shock absorbing assembly according to claim 12 wherein:

said drive member further includes a second drive wall opposite said driven wall, said drive wall being located between said first drive wall and said second drive wall, operation of the down-hole air hammer generating oppositely directed axial forces to urge said second drive wall towards said driven wall; and said shock absorbing assembly further includes a second resilient member disposed between said second drive wall and said driven wall, said second drive wall and said driven wall compressing said second resilient member to absorb shocks in addition to those absorbed by the first resilient member after a predetermined amount of axial forces are imposed on said shock absorbing assembly.

14. A shock absorbing assembly according to claim 12 wherein the sticking of the drill string in the earth generates opposing axial forces on said first drive wall and said driven wall to urge said first drive wall and said driven wall towards each other to compress said first resilient member to aid in the freeing of the drill string.

* * * * *